United States Patent [19]

Kawasaki et al.

[11] 4,378,455

[45] Mar. 29, 1983

[54] PROCESS FOR BULK ALTERNATING COPOLYMERIZATION OF PROPYLENE AND BUTADIENE

[75] Inventors: Akihiro Kawasaki; Tsuyoshi Matsumoto, both of Ichihara; Masanobu Taniguchi, Narashino; Isao Maruyama, Ichihara; Masaaki Matsui, Ichikara; Masao Kaneko, Ichihara; Akihiko Imai, Tokyo, all of Japan

[73] Assignee: Maruzen Petrochemical Co., Ltd., Tokyo, Japan

[21] Appl. No.: 122,192

[22] Filed: Feb. 19, 1980

[30] Foreign Application Priority Data

Feb. 19, 1979 [JP] Japan .................. 54-18763

[51] Int. Cl.³ .................. C08F 2/02; C08F 236/06
[52] U.S. Cl. .................. 526/114; 252/429 C; 526/115; 526/116; 526/122; 526/127; 526/129; 526/137; 526/144; 526/155; 526/157; 526/169.2; 526/339; 526/902
[58] Field of Search .............. 526/114, 115, 116, 122, 526/127, 129, 137, 144, 155, 157, 169.2, 339

[56] References Cited

U.S. PATENT DOCUMENTS

| | | |
|---|---|---|
| 3,370,052 | 2/1968 | Mostardini et al. ............. 526/169.2 |
| 3,582,987 | 6/1971 | Natta et al. ...................... 526/169.2 |
| 3,652,518 | 3/1972 | Kawasaki ............................ 526/339 |
| 3,674,755 | 7/1972 | Yamamoto et al. ............. 526/169.2 |
| 3,824,224 | 7/1974 | Kawasaki et al. .................. 526/339 |
| 3,883,493 | 5/1975 | Yamao et al. ....................... 526/339 |
| 3,919,180 | 11/1975 | Furukawa et al. ................. 526/339 |

FOREIGN PATENT DOCUMENTS

| | | |
|---|---|---|
| 46-43088 | 12/1971 | Japan . |
| 46-43089 | 12/1971 | Japan . |
| 46-43090 | 12/1971 | Japan . |
| 47-8611 | 3/1972 | Japan . |
| 47-8615 | 3/1972 | Japan . |
| 47-9412 | 3/1972 | Japan . |
| 47-9413 | 3/1972 | Japan . |
| 47-16182 | 5/1972 | Japan . |
| 47-16183 | 5/1972 | Japan . |
| 47-16184 | 5/1972 | Japan . |
| 47-16185 | 5/1972 | Japan . |
| 47-16656 | 5/1972 | Japan . |
| 47-19694 | 6/1972 | Japan . |
| 47-26871 | 7/1972 | Japan . |
| 47-28715 | 7/1972 | Japan . |

OTHER PUBLICATIONS

Derwent CPI, 1972, Ref. 32426T-A.
Derwent CPI, 1972, Ref. 32319T-A.
Derwent CPI, 1972, Ref. 43998P-A.
Derwent CPI, 1972, Ref. 37501P-A.
"Butadiene-Propylene Alternating Copolymers", Junji Furukawa, J. Polymer Sci.: Symposium No. 48, 19-31, (1974).
"Physical Properties of Propylene-Butadiene Copolymer", A. Kawasaki et al, International Rubber Conference, 1975, Tokyo, I-1-03, pp. 13-18.

*Primary Examiner*—Edward J. Smith
*Attorney, Agent, or Firm*—Frishauf, Holtz, Goodman & Woodward

[57] ABSTRACT

The present disclosure relates to a process for alternating copolymerization of propylene and butadiene in the absence of a polymerization solvent. The disclosure contains information relative to commercial production of the said copolymer and detailed teachings relative to the preparation of catalyst for use in the said process.

10 Claims, No Drawings

PROCESS FOR BULK ALTERNATING COPOLYMERIZATION OF PROPYLENE AND BUTADIENE

BACKGROUND OF THE INVENTION

1. Field of the Invention

The present invention relates to an improved process for the preparation of an alternating copolymer of propylene and butadiene. Although the wide general utility of cis-1,4-polybutadiene which is a synthetic rubber having structural regularity is widely known, it is considered to have some limitations in the field of automobile tires because of its chipping and cutting phenomenon and because of its low skid resistance. Also, though the properties of cis-1,4-polyisoprene which is another synthetic rubber having structural regularity, as its structure suggests, resembles closely to those of natural rubber, it may not be regarded as advantageous with respect to a stable supply of the raw material and is generally regarded as a poor candidate for a synthetic rubber with a broad spectrum use.

On the other hand, in pace with the wider use of radial tires for automobile and the wider use of heavy weight cars, the demand has increased for rubbers having structural regularity such as natural rubber and cis-1,4-polyisoprene rubber which have properties required for such uses, and the development of these rubbers and other synthetic rubbers having structural regularity with similar structures is greatly needed.

Some of us have made an extensive and scrutinous study of developing a process for the preparation of new alternating copolymer rubbers from propylene and butadiene which are both commercially available in abundance, and they have disclosed a number of processes for the alternating copolymerization of an α-olefin and a conjugated diene with a catalyst system comprising a vanadium or a titanium compound as a transition metal compound. For example, some of us already disclosed that, in the case of the alternating copolymer of propylene and butadiene, when prepared with a vanadium-type catalyst, the micro-structure of the butadiene units in the alternating copolymer has a trans-1,4-configuration, and cristallizaton can be induced by stretching to give excellent strength properties to the copolymer; while that prepared with a titanium-type catalyst has an uneven micro-structure and shows a far excellent low temperature properties.

The properties of the alternating copolymers obtained by these processes have also been extensively investigated, and the evaluation of the rubbery properties of the propylene-butadiene alternating copolymer was reported by some of us in The International Rubber Conference (held in Tokyo, October, 1975) Text, p 13, and by Furukawa in Journal of Polymer Science, Symposium, Vol. 48, pp. 19-31 (1974), and their excellent properties have already been fully pointed out.

In line with the recent trend toward energy saving, research effort has been directed recently to an establishment of a polymerization process which allows a shift from solution polymerization to bulk polymerization (as liquid, solid or gas phase). Although a few of such attempts has been successful, many such project have not yet been realized because of difficulties which arise on converting a process from solution polymerization to bulk polymerization. Examples of the difficulties which hinder the realization of bulk polymerization include: lowering of catalyst activity, gel formation during polymerization, difficulties in the control of reaction or formation of by-products because of an unefficient removal of the heat of the reaction due to an excessive rise in viscosity.

The present invention relates to a process suitable for an alternating copolymerization reaction between propylene and butadiene by bulk polymerization.

2. Description of the Prior Art

Some of us have already disclosed many processes for alternating copolymerization of an α-olefin and butadiene by a catalyst system consisting mainly of a vanadium compound as the transition metal compound.

Representative catalyst systems for the processes include:

(1) A catalyst system comprising organoaluminum compound—vanadium(V) chloride (Japanese Patent Publication No. 43088/71, See U.S. Pat. No. 3,652,518);

(2) A catalyst system comprising organoaluminum compound—vanadium(VI) chloride (Japanese Patent Publication No. 43089/71, see U.S. Pat. No. 3,652,518)

(3) A catalyst system comprising organoaluminum chloride compound—vanadium compound (Japanese Patent Publication No. 16182/72);

(4) A catalyst system comprising organoaluminum compound—vanadium compound—chromyl chloride (Japanese Patent Publication No. 43090/71);

(5) A catalyst system comprising organoaluminum chloride compound—alkoxyvanadyl chloride (Japanese Patent Publication No. 16183/72);

(6) A catalyst system comprising organoaluminum compound—vanadyl alkoxide—chromyl chloride (Japanese Patent Publication No. 16184/72, see U.S. Pat. No. 3,652,518);

(7) A catalyst system comprising organoaluminum compound—vanadium complex compound—chloroalkane (Japanese Patent Publication No. 16185/72);

(8) A catalyst system comprising organoaluminum compound—vanadium complex compound—thionyl chloride (Japanese Patent Publication No. 8611/72);

(9) A catalyst system comprising organoaluminum compound—VCl$_4$—compound containing OH group, P or S (Japanese Patent Publication No. 8615/72);

(10) A catalyst system comprising organoaluminum compound—vanadium alkoxide—halogen containing compound (Japanese Patent Publication No. 8616/72, see U.S. Pat. No. 3,652,518);

(11) A catalyst system comprising organoaluminum compound—vanadium complex compound—halogen containing compound (Japanese Patent Publication No. 16656/72);

(12) A catalyst system comprising organoaluminum compound—compound having Ti-X bond—compound having V-OR bond (Japanese Patent Publication No. 9412/72, see U.S. Pat. No. 3,652,518);

(13) A catalyst system comprising organoaluminum compound—compound having V-X bond—compound having Al-OR bond (Japanese Patent Publication No. 9413/72, see U.S. Pat. No. 3,824,224);

(14) A catalyst system comprising organoaluminum compound—compound having V-X bond—compound having hydroxy group (Japanese Patent Publication No. 19694/72);

(15) A catalyst system comprising organoaluminum compound—compound having V-X bond—compound having metal-OR bond (Japanese Patent Publication No. 26871/72, see U.S. Pat. No. 3,824,224 and

(16) A catalyst system comprising organoaluminum compound—compound having V-X bond—compound having metal-OR bond—metal carboxylate (Japanese Patent Publication No. 28715/72, see U.S. Pat. No. 3,824,224).

However, these catalyst system are suitable for performing the polymerization reaction in the presence of an aliphatic saturated hydrocarbon such as hexane, heptane, octane, etc., an aromatic hydrocarbon such as benzene, toluene, xylene, etc., or a halogenated hydrocarbon solvent such as methylene chloride, tetrachloroethylene, chlorobenzene, etc.

When solvent-free catalyst components are mixed and especially when organoaluminum compound is mixed in the absence of solvent, an exothermic reaction takes place to give an ununiform catalyst system, and it results in lowering of the yield of the alternating copolymer and hinders the desired alternating copolymerization reaction by causing gel formation, formation of polybutadiene, propylene-butadiene block copolymer and in some cases, polypropylene by-products; and the properties of the copolymer thus prepared is often of low quality.

As described above, in the use of the vanadium catalyst for the preparation of an alternating copolymer of an α-olefin and a conjugated diene which some of us have already disclosed, the preparation of the said catalyst requires the use of a solvent in order to reduce the heat of reaction and also requires the use of a considerable amount of solvent during the polymerization to reduce the viscosity of the polymer solution formed during the polymerization. The use of a solvent suffers from disadvantages because it requires a purification process of the solvent to remove impurities which are usually always present in the solvent and the re-use of a solvent of polymerization necessitates its recovery and purification processes.

SUMMARY OF THE INVENTION

In order to overcome these disadvantages, we have accordingly made long and extensive studies toward development of a process suitable for bulk copolymerization, i.e. without using a solvent and found a bulk copolymerization process which, by preparation of a catalyst under special conditions, permits a higher-yield preparation of an alternating copolymer than those attainable by solution polymerization, without the formation of gel and by-products during the reaction.

The main advantages attainable by the shift from solution to bulk copolymerization are:

(1) larger amounts of a copolymer is obtainable even when the catalyst concentration (per monomer) is lower than that of solution copolymerization;

(2) the amounts of the copolymer per unit volume of a reactor is increased;

(3) purification and recovery processes of solvents are not required because no solvent is used;

(4) the lower viscosity of the copolymerization system than that of solution copolymerization facilitates stirring and removal of the heat of reaction; and (5) if required, part of the monomers may be evaporated during the copolymerization in order to remove effectively the heat of copolymerization by the latent heat of vaporization.

The present invention relates to a process for preparation of an alternating copolymer of propylene and butadiene, characterized in that the reaction is allowed to proceed essentially in the absence of solvent at a temperature range of $-100°-+50°$ C., by the use of a catalyst system containing a trialkylaluminum compound, a vanadium(V) component, a halogen component and an alkoxyl component from the various catalyst systems disclosed earlier by some of us.

The present invention accordingly relates especially to the processes of Japanese Patent Publication Nos. 16184/72; 8616/72; 9412/72; 9413/72; 19694/72 and 26871/72 afore-mentioned, and may be regarded as an utilized invention of or selected invention from the above early inventions.

For the ease of operation of the process of the present invention, each catalyst component is sometimes used as its solution after being dissolved in a small amount of a hydrocarbon or a halogenated hydrocarbon solvent, but the amount of the solvent employed is so small that it can be negligible as a solvent of the polymerization reaction.

The catalyst systems used in the present invention containing a trialkylaluminum compound, a vanadium(V) component, a halogen component, and an alkoxyl component will be exemplified below, but they are not for the purpose of giving restriction to the catalyst. They are:

(1) A catalyst system comprising a trialkylaluminum compound, a vanadyl trihalide compound and an aluminum trialkoxide;

(2) A catalyst system comprising a trialkylaluminum compound and an alkoxyvanadyl halide compound; and (3) A catalyst system comprising a trialkylaluminum compound, a vanadyl trialkoxide compound and an elemental halogen or a halide.

In the list described above, each component constituting each catalyst system is not restricted to any one kind and a mixture of two or more kinds of compounds may be employed.

DETAILED DESCRIPTION OF THE INVENTION

In the catalyst described above, a trialkylaluminum compound is defined by the general formula: $AlR^1R^2R^3$ (wherein $R^1$, $R^2$, and $R^3$ may be the same or different and may be selected independently from the group consisting of a straight chain, a branched chain or a cyclic, monovalent aliphatic hydrocarbon radical with two to ten carbon atoms), and may include, for example, compounds with the general formula $AlR^1_3$, $AlR^1_2R^2$, $AlR^1R^2R^3$, etc., the latter two of which may be prepared by reactions such as a stoichiometric exchange reaction of the hydrocarbon radical among more than one trialkylaluminum compounds or by the reaction between a trialkylaluminum compound or an alkylaluminum hydride and olefins. A vanadyl trihalide compound is defined by the general formula: $VOX_3$ (wherein X is a chlorine or a bromine and each X may be the same or different). An aluminum trialkoxide compound is defined by the general formula: $Al(OR')(OR'')(OR''')$ (wherein R', R'' and R''' may be the same or different and may be selected independently from the group consisting of a straight chain, a branched chain or a cyclic, monovalent aliphatic hydrocarbon radical with two to ten carbon atoms) and may be exemplified by $Al(OR')_3$, $Al(OR')_2(OR'')$, $Al(OR')(OR'')(OR''')$, etc., the latter two of which may be prepared by reactions such as the stoichiometric alkoxyl group exchange reaction among two or more aluminum trialkoxide compounds, the reaction of a trialkylaluminum compound with two or more alcohols and the exchange reaction of an aluminum trialkoxide with one or more alcohols. An alkoxyvanadyl halide is defined by the general formula: $VO(OR')_m(OR'')_nX_{3-m-n}$ (wherein R' and R" may be the same or different and may be selected independently from the group consisting of a straight chain, a branched chain or a cyclic, monovalent aliphatic hydrocarbon radical with two to ten carbon atoms, X is either a chlorine or a bromine and each m and n is an integer which satisfies the equation: $m+n=1$ or 2) and may include $VO(OR')_2X$ and $VO(OR')X_2$, which are prepared by reactions such as the reaction of a vanadyl trihalide with an alcohol or by a stoichiometric alkoxyl or halogen exchange reaction between a vanadyl trihalide and a vanadyl trialkoxide or an alkoxyvanadyl halide, $VO(OR')(OR'')X$, prepared by reactions such as the reaction of a vanadyl trihalide compound with two kinds of alcohols or a stoichiometric alkoxyl or halogen exchange reaction between a vanadyl trihalide compound and two kinds of vanadyl trialkoxides or alkoxyvanadyl halides and a mixture of vanadyl trihalide (as defined before) and alkoxyvanadyl halide (as defined before) with an average composition represented by the general formula: $VO(OR')_{m'}(OR'')_{n'}X_{3-m'-n'}$ (wherein R', R" and X are as defined before and m' and n' are numbers which satisfies the equation: $2>m'+n'\geq 0.2$).

A vanadyl trialkoxide compound is defined by the general formula: $VO(OR')(OR'')(OR''')$ (wherein R', R" and R''' are as defined in the case of aluminum trialkoxide described above) and may include, for example, $VO(OR')_3$, $VO(OR')_2OR''$ and $VO(OR')(OR'')(OR''')$, the latter two of which may be prepared by reactions such as a stoichiometric alkoxyl group exchange reaction between two or more vanadyl trialkoxide compounds or by an alcohol residue exchange reaction of a vanadyl alkoxide compound with one or more alcohols.

An elemental halogen is elemental chlorine, bromine or iodine and a halide indicates a chloride, bromide, iodide, oxychloride, oxybromide or oxyiodide of hydrogen atom, a transition metal element or an element of IIIa, IVa, Va, VIa and VIIa group of the periodic table and may include $HX'$, $HOX'$, $TiX'_4$, $ZrX'_4$, $ZrOX'_2$, $VX'_4$, $VOX'_3$, $NbX'_5$, $NbOX'_3$, $TaX'_5$, $CrX'_3$, $CrX'_2$, $CrO_2X'_2$, $MoX'_5$, $MoX'_4$, $MoOX'_3$, $WX'_5$, $WX'_6$, $WO_2X'_2$, $MnX'_4$, $MnX'_2$, $FeX'_3$, $FeX'_2$, $CoX'_3$, $CoX'_2$, $NiX'_2$, $BX'_3$, $AlX'_3$, $GaX'_3$, a monohalide, dihalide, trihalide and tetrahalide of carbon such as t-butyl halide, 1,1-dihaloethane, haloform, carbon tetrahalide, etc., a carboxylic acid halide which is an oxymonohalide of carbon, phosgene which is an oxydihalide of carbon, $SiX'_4$, $Si_2OX'_6$, $GeX'_4$, $GeOX'_2$, $SnX'_4$, $NOX'$, $NOX'_3$, $PX'_3$, $PX'_5$, $POX'_3$, $AsX'_3$, $AsOX'$, $SbX'_5$, $SbX'_3$, $SbOX'_3$, $SbOX'$, $BiX'_3$, $BiOX'$, $SX'_4$, $SX'_2$, $S_2O_5X'_2$, $SO_2X'_2$, $SOX'_2$, $SeX'_4$, $SeOX'_2$, $F_5I$, $BrI$, $ICl$, $ICl_3$, $X'O_2$, $X'_2O$ (wherein X' is chlorine, bromine or iodine and every X' may be independently selected), etc.

In order to realize the advantageous effect of the present invention, it is necessary that the order of the addition of the catalyst components should be such that a system containing both a vanadium component and an alkoxy component be brought into contact and mixing with a trialkylaluminum compound.

Thus, a catalyst system containing a component consisting of a vanadium compound containing both a vanadium and an alkoxyl radical such as an alkoxyvanadyl halide compound or a vanadyl trialkoxide compound may be directly brought into contact and mixing with a trialkylaluminum compound, but when a catalyst system containing a component consisting of vanadium trihalide without an alkoxyl group is used, a vanadyl trihalide compound should first be allowed to contact and mix with a component having an alkoxyl group such as aluminum trialkoxide before it is allowed to contact and mix with a trialkylaluminum compound.

Though the order of addition of the halogen component is not specifically restricted, the catalyst activity is generally higher when the halogen component is mixed first with the trialkylaluminum compound rather than with the vanadium component. Thus, a higher activity is generally observed when a catalyst system is prepared by allowing a system consisting of a halogen component and a trialkylaluminum component to contact and mix with a vanadyl trialkoxide compound, than when it contains a component consisting of a vanadyl trihalide compound or an alkoxyvanadyl halide compound.

The conditions for the contact and mixing of a vanadium component and a halogen component, the conditions for the contact and mixing of a halogen component and a trialkylaluminum compound, and the conditions for the contact and mixing of a vanadium component and an alkoxyl group component are not specifically restricted and each components may be brought into contact and mixing as itself or, for ease of operation, each or a part of the components may be dissolved in a hydrocarbon solvent, a halogenated hydrocarbon solvent or a monomer and then brought into contact and mixing. When solution are used, it is preferable to dissolve in a monomer or monomers in view of the recovery of the solvent. The temperature of the contact is usually within the range of $-80°-+100°$ C. and preferably within $-50°-+70°$ C.

Independent of the conditions of the addition of other components, the conditions for the contact and mixing of a vanadium component (or a system containing vanadium) and a trialkylaluminum compound (or a system containing a trialkylaluminum compound) are very important for realization of the advantageous effect of the present invention and they should be brought into contact in the presence of more than 1/100 and preferably 1/50-½ (volume) of the total amount of the monomer used for the polymerization, usually at a temperature within the range of $-100°-+50°$ C. and preferably at $-80°-0°$ C.

As will be shown in Example 26, a higher activity catalyst is prepared when the components are initially mixed in a portion of the total amount of the monomers followed by addition of the remaining monomers, than when they are mixed in the total amount of the monomers. This result is unpredictable because every steps of Example 26 was performed without interval and the times required for completion of the addition of the total amount of the monomers in the two procedures in this Example were practically the same.

In this step, when the two components described above are mixed as itself in the absence of a monomer, the alternating copolymerization reaction of the present invention does not proceed at a favorable rate and side reactions occur. For ease of handling of the two components described above, they are sometimes used as their solutions by dissolving it in a small amount of a hydrocarbon solvent or a halogenated hydrocarbon solvent, but it by no means indicates the necessity of these solvents for the mixing step and is only for the purpose of the ease of the operation. It is preferable to use the monomers instead of the solvents described above, from the standpoint of the recovery process of the solvent and from the purpose of the present invention.

The suitable ratio of mixing of each catalyst components are within the ranges of $100>Al/V>0.5$ and preferably $50>Al/V>2$; $20>OR/V>0.5$ and preferably $10>OR/V>1$; and $10>X/V>0.5$ and preferably $5>X/V>1$, based on atomic or radical ratio and the catalyst concentration based on vanadium is within the range of 0.0001–0.5 mole % (per total monomer) and preferably 0.0005–0.1 mole %.

The polymerization reaction is performed at a temperature and pressure which keep the mixture of propylene and butadiene at a liquid state and by a continuous or batch process and the temperature of the polymerization is within the range of $-100°-+50°$ C. and preferably $-80°-+30°$ C., the time of the polymerization is within the range of 0.2–50 hr and the ratio of the initial feed of the monomers is within the range: propylene/butadiene=20/1–1/10 (mole/mole) and preferably 10/1–1/5 (mole/mole). During the polymerization, catalyst and monomers may be supplemented, the polymerization temperature may be changed and monomers may be removed partly to outside of the reaction system without unfavorable effect.

The copolymerization may usually be terminated by addition of a small amount of an alcohol and antioxidants and stabilizers may be added as required.

Unreacted monomers may be recovered by evaporation, distillation, steam distillation, etc. If it is desired, any suitable solvent can be added prior to the distillation.

DESCRIPTION OF THE PREFERRED EMBODIMENT

In the followings, this invention is materially described by examples. Please note, however, that the following examples are given only for the purpose of illustration and this invention is not limited thereby. Incidentally, in the following examples, intrinsic viscosities ($\eta$) were measured in toluene at 30° C. unless otherwise specified.

EXAMPLE 1

Into a nitrogen purged 25 ml glass polymerization tube at room temperature, 0.02 ml of a hexane solution of vanadyl trichloride (1 mole/liter) and 0.028 ml of a hexane solution of aluminum tri(3-methyl-1-isobutylbutoxide): $Al\{OCH[CH_2CH(CH_3)_2]_2\}_3$ (1 mole/liter) were added. After 5 min, it was placed in a bath kept at $-78°$ C. and 8 ml of a liquid mixture of propylene and butadiene monomers (butadiene/propylene=1.2/1; mole/mole), then 0.20 ml of a hexane solution of diisobutyl-mono-2-methylbutylaluminum: $Al[CH_2CH(CH_3)_2]_2CH_2CH(CH_3)CH_2CH_3$ were successively added in this order. The tube was sealed and the copolymerization was allowed to proceed for 16 hr at $-30°$ C. without shaking to give 1.19 g of an alternating copolymer of propylene and butadiene. This had an intrinsic viscosity of 1.26, did not contain gel, and the micro-structure of the butadiene units was almost 1,4-trans.

EXAMPLE 2

Into a nitrogen purged 25 ml glass polymerization tube at room temperature, 0.1 ml of a hexane solution of vanadyl trichloride (0.1 mole/liter) and 0.1 ml of a hexane solution of aluminum tri(2,2,4-trimethyl-1-pentoxide): $Al[OCH_2C(CH_3)_2CH_2CH(CH_3)_2]_3$ (0.5 mole/liter) were added. After 5 min, it was placed in a bath kept at $-78°$ C., and 10 ml of a liquid mixture of propylene and butadiene monomers (butadiene/propylene=3/1; mole/mole) and 0.08 ml of a hexane solution of triisobutylaluminum (0.2 mole/liter) were successively added. The tube was then sealed and the copolymerization was allowed to proceed by standing for 5 hr at $-45°$ C. The polymerization was stopped by addition of a small amount of methanol and the unreacted monomers were removed under reduced pressure to give 2.4 g of an alternating copolymer of propylene and butadiene. The micro-structure of the butadiene units was almost 1,4-trans and it dit not contain gel and had an intrinsic viscosity of 2.10.

EXAMPLE 3

Into a nitrogen purged 25 ml glass polymerization tube at room temperature, 0.18 ml of a hexane solution of vanadyl tribromide (0.02 mol/liter) and 0.013 ml of a hexane solution of aluminum tri(2,2,4-trimethyl-1-pentoxide) (0.5) mole/liter) were added. After 15 min, it was placed in a bath kept at $-50°$ C. and 10 ml of a liquid mixture of propylene and butadiene monomers (butadiene/propylene=2/1; mole/mole) and 0.06 ml of a hexane solution of triisobutylaluminum (0.5 mole/liter) were added successively. After 30 sec, it was transfered to a bath kept at $-78°$ C., sealed and was kept standing for 2 hr at $-60°$ C. to allow the copolymerization to proceed. The content was then poured into methanol containing a small amount of a phenolic antioxidant to stop the polymerization and the unreacted monomers and methanol were removed under a reduced pressure to give 1.3 g of an alternating copolymer of propylene and butadiene. The micro-structure of the butadiene units was almost 1,4-trans and it did not contain gel, had an intrinsic viscosity of 2.34 and had a number average molecular weight of 136,000.

EXAMPLE 4

Into a nitrogen purged 25 ml glass polymerization tube, 10 ml of a liquid mixture of propylene and butadiene monomers (butadiene/propylene=2/1; mole/mole) and 0.08 ml of a hexane solution of triisobutylaluminum (0.5 mole/liter) were added at $-78°$ C. In another tube at room temperature, 0.108 ml of a hexane solution of aluminum tri(2,2,4-trimethyl-1-pentoxide) (0.05 mole/liter), 0.052 ml of a hexane solution of aluminum tri(tert-butoxide): $Al[OC(CH_3)_3]_3$ (0.05 mole/liter) and 0.1 ml of a hexane solution of vanadyl tribromide (0.05 mole/liter) were mixed and the resulting solution was added to the polymerization tube described above, the tube was sealed and the copolymerization was allowed to proceed for 2.5 hr at $-60°$ C. without shaking.

The contents were then poured into methanol containing a small amount of a phenolic antioxidant and dried under a reduced pressure to give 1.08 g of an alternating copolymer of butadiene and propylene without gel and with an almost 1,4-trans micro-structure.

EXAMPLE 5

Into a nitrogen purged 25 ml glass polymerization tube, 10 ml of a liquid mixture of propylene and butadiene monomers (butadiene/propylene=2/1; mole/mole) and 0.05 ml of a hexane solution of triisobutylaluminum (0.5 mole/liter) were added at $-60°$ C. In another tube at room temperature, 0.11 ml of a hexane solution of aluminum tri(2,2,4-trimethyl-1-pentoxide) (0.05 mole/liter) and 0.06 ml of a hexane solution of vanadyl trichloride (0.05 mole/liter) were mixed and the resulting solution was added to the polymerization tube described above. The tube was then sealed and was allowed to stand for 2 hr at −60° C. for the copolymerization to proceed. The contents were then poured into methanol containing a small amount of a phenolic antioxidant and dried under a reduced pressure to give 0.6 g of an alternating copolymer of butadiene and propylene with almost 1,4-trans microstructure and without gel.

EXAMPLE 6

A monomer mixture consisting of 170 ml of liquid propylene and 570 ml of liquid butadiene and 22.5 ml of a hexane solution of triisobutylaluminum (0.5 mole/liter) were added at −55° C. into a nitrogen purged 1 liter glass vessel for catalyst preparation. In a separate vessel, 29.7 ml of a hexane solution of vanadyl trichloride (0.1 mole/liter) and 46.2 ml of a hexane solution of a tert-butanol alcoholysis product of aluminum tri(sec-butoxide): $Al[OCH(CH_3)CH_2CH_3]_3$ {with an average composition: $Al[OCH(CH_3)CH_2CH_3]_{2.4}[OC(CH_3)_3]_{0.6}$} (0.1 mole/liter) were mixed at room temperature. The mixture was allowed to stand for 9 min and then was added to the glass vessel for catalyst preparation described above, and the resulting mixture was allowed to stand 1 min at −55° C. The contents of the vessel was introduced, under an atmosphere of nitrogen, to a 2 liter glass autoclave containing 170 ml of liquid propylene and 630 ml of liquid butadiene kept at −80° C. and the polymerization was allowed to proceed with stirring at −73° C. The relation among the reaction time, yield and intrinsic viscosity is given in Table 1.

TABLE 1

Relation among Reaction Time, Yield and Intrinsic Viscosity

| Experiment No. | Time hr | Yield (based on propylene/ butadiene = 1/1) % | Intrinsic viscosity |
|---|---|---|---|
| 1 | 1 | 12.4 | 2.11 |
| 2 | 2 | 21.6 | — |
| 3 | 3 | 29.9 | 2.34 |
| 4 | 4 | 35.5 | — |
| 5 | 5 | 41.2 | 2.34 |
| 6 | 6 | 45.6 | — |
| 7 | 7 | 49.0 | 2.26 |

The micro-structure of every alternating copolymer listed above was almost 1,4-trans and did not contain gel.

EXAMPLE 7

Into a nitrogen purged 25 ml glass polymerization tube, 0.02 ml of a toluene solution of vanadyl trichloride (1 mole/liter) and 0.03 ml of a toluene solution of an aluminum trialkoxide (1 mole/liter) were added at room temperature; then the tube was placed in a bath kept at −78° C. and 8 ml of a liquid mixture of propylene and butadiene (butadiene/propylene=1.2/1; mole/mole) and 0.1 ml of a toluene solution of triisobutylaluminum (1 mole/liter) were successively added and the tube was sealed and kept standing for 6 hr at −30° C. for the copolymerization to proceed, to give the results shown in Table 2.

TABLE 2

| Experiment No. | Aluminum alkoxide compound | Alternating copolymer yield (η) |
|---|---|---|
| 1 | $Al[OCH(CH_3)_2]_3$ | 0.90 0.82 |
| 2 | $Al[OCH(C_2H_5)CH_2CH_2CH_2cH_3]_3$ | 2.38 0.79 |
| 3 | $Al[OCH_2CH\underset{CH_2\ CH_2}{\overset{CH_2-CH_2}{\diagup\diagdown}}CH_2]_3$ | 0.64 0.84 |
| 4 | $Al[OCH_2CH_2CH_2CH_2CH_2CH_2CH_2CH_3]_3$ | 0.33 0.50 |
| 5 | $Al[OCH(CH_3)CH_2CH_2CH_2CH_2CH_2CH_3]_3$ | 1.30 0.94 |

REFERENCE EXAMPLE 1

A hexane solution of a catalyst was prepared in a nitrogen purged 30 ml Erlenmeyer flask by addition at room temperature of 1.0 mmol (0.094 ml) of vanadyl trichloride and 1.5 mmol (0.37 ml) of a tert-butanol alcoholysis product of aluminum tri(sec-butoxide) {corresponding to an average composition of $Al[OCH(CH_3)CH_2CH_3]_{2.4}[OC(CH_3)_3]_{0.6}$}, mixing of the mixture until homogeneous. Then, cooling the flask in a bath kept at −50° C., 6.0 mmol (1.53 ml) of triisobutylaluminum was slowly added into the flask with stirring until homogeneous and after kept for 10 min at rest, hexane was slowly added thereto to make a total volume of 2.5 ml.

To a nitrogen purged 25 ml glass polymerization tube in a bath kept at −78° C., 10 ml of a mixture of liquid propylene and butadiene monomers (butadiene/propylene=1.7/1; mole/mole) were added and then 1 ml of the hexane solution of the catalyst described above (0.4 mmol vanadium content) was rapidly added. The tube was sealed and the copolymerization was allowed to proceed without shaking for 18.5 hr at −50° C. to give 0.67 g of a block copolymer of propylene and butadiene which contained gel. The propylene content of this polymer was 44.2 mole % and the microstructure of the butadiene units consisted of 92.8% 1,4-trans and 7.2% 1,2-vinyl structure and it had an intrinsic viscosity of 0.7.

EXAMPLE 8

Into a nitrogen purged 100 liter stainless steel polymerization reactor, 17.9 Kg of commercial butadiene and 6.8 Kg of commercial propylene both of which had previously been dehydrated and dried by the use of molecular sieves (properties were listed in Tables 5 and 6) were charged and the content was kept at −70° C.

Into a nitrogen purged 20 liter stainless steel vessel for catalyst preparation, 7.2 Kg of butadiene and 2.9 Kg of propylene, both of which had properties identical with those described earlier, 0.027 mole of aluminum tri(2,2,4-trimethyl-1-pentoxide), 0.015 mole of vanadyl tribromide and 0.12 mole of triisobutylaluminum were added successively with stirring at −50° C. After 1 min, the resulting mixture was transfered through a connecting piper to the said 100 liter vessel and the mixture was stirred at −70° C. for 11 hr for the polymerization to proceed.

The polymerization was terminated by addition of 1 liter of methanol containing a small amount of a phenolic antioxidant to give 4.5 Kg of an alternating copolymer of propylene and butadiene. It did not contain gel, had an intrinsic viscosity of 2.90 and had a number-average molecular weight of 199,000 and the microstructure of its butadiene units was almost 1,4-trans structure.

This rubber was vulcanized by a conventional process by roll-mixing of 50 wt. parts of carbon black (IISAF), 5 wt. parts of an aromatic oil, 1 wt. part of antioxidant D (N-phenyl-β-naphthylamine), 3 wt. parts of ZnO, 2 wt. parts of stearic acid, 1 wt. part of an vulcanization accelerator (MSA) and 0.5 wt. part of sulfur with 100 wt. parts of this rubber for 55 min at 150° C. to give a product with properties listed in the Table below:

TABLE 3

Properties of the Unvulcanized Compound

| Item | | Value |
|---|---|---|
| Mooney viscosity | $ML_{1+4}^{100°\ C.}$ | 151 |
| Green strength | $Kg/cm^2$ | 8.3 |
| Tackiness | $Kg/cm^2$ | 1.26* |
| Elongation at break | % | 290 |

*The properties of the unvulcanized rubbers compounded by the same conditions were: $SBR_{1500}$, 0.6; Br, 0.6; IR, 1.5 and NR, 5.2.

TABLE 4

Properties of the Vulcanized Compound

| Item | | Value |
|---|---|---|
| Shore Hardness | HS | 66 |
| 300% Modulus | $Kg/cm^2$ | 113 |
| Tensile strength | " | 327 |
| Elongation at break | % | 600 |
| Tear strength | $Kg/cm^2$ | 55 |
| Resiliency | % | 59 |
| Heat build up ΔT | °C. | 21.5* |
| Compression set | % | 17.8 |
| Cut growth (de Mattia) | mm/cycle | 20.3/80,000 |

*Goodrich flexometer; 25 min.

TABLE 5

Properties of Raw Material Butadiene

| Component | | Content |
|---|---|---|
| propadiene | wt. ppm | less than 5 |
| methylacetylene | " | less than 5 |
| 1,3-butadiene | wt. % | 99.62 |
| 1,2-butadiene | wt. ppm | less than 5 |
| ethylacetylene | " | less than 5 |
| vinylacetylene | " | less than 5 |
| non-volatile matters | wt. % | less than 1 |
| $C_4$—monoolefins | " | 0.38 |

TABLE 6

Properties of the Raw Material Propylene

| Component | | Content |
|---|---|---|
| ethylene | mole ppm | less than 1 |
| propylene | mole % | 99.00 |
| propane | mole % | 1.00 |
| propadiene | mole ppm | less than 1 |
| 1,3-butadiene | mole ppm | less than 1 |
| acetylenes | mole ppm | less than 1 |

EXAMPLE 9

Into a nitrogen purged 100 liter stainless steel polymerization reactor, 25.0 Kg of commercial butadiene and 10.1 Kg of commercial propylene, both of which had previously been dehydrated and dried by the use of molecular sieves (the properties were listed in Tables 9 and 10), were charged and the content was kept at −55° C. To this reactor, 80 ml of a liquid butadiene solution containing 0.0143 mole of aluminum tri(tert-butoxide) and 0.0297 mole of aluminum tri(2,2,4-trimethyl-1-pentoxide), 200 ml of a liquid propylene solution containing 0.0275 mole of vanadyl tribromide and 500 ml of liquid mixture of propylene and butadiene (butadiene/propylene = 1/1; mole/mole) containing 0.220 mole of triisobutylaluminum were added, successively, under pressure and with stirring. The polymerization was then allowed to continue at −60° C. for 9 hr with stirring. The polymerization was stopped by addition of 1 liter of methanol containing a small amount of a phenolic antioxidant to give 5.1 Kg of an alternating copolymer of propylene and butadiene. It did not contain gel, had an intrinsic viscosity of 2.10 and had a number-average molecular weight of 117,000 and the micro-structure of its butadiene units was almost 1,4-trans structure.

This rubber was vulcanized by a conventional process by roll-mixing of 50 wt. parts of carbon black (IISAF), 5 wt. parts of an aromatic oil, 1 wt. part of anitoxidant D (N-phenyl-β-naphthylamine), 3 wt. parts of ZnO, 2 wt. parts. of stearic acid, 1 wt. part of a vulcanization accelerator (MSA) and 0.5 wt. part of sulfur with 100 wt. parts of this rubber at 150° C. for 55 min to give a product with properties listed in the Tables below:

TABLE 7

Properties of the Unvulcanized Compound

| Item | | Value |
|---|---|---|
| Mooney viscosity | $ML_{1+4}^{100°\ C.}$ | 97 |
| Green strength | $Kg/cm^2$ | 5.6 |
| Tackiness | $Kg/cm^2$ | 2.85 |
| Elongation at break | % | more than 900 |

TABLE 8

Properties of the Vulcanized Compound

| Item | | Value |
|---|---|---|
| Shore Hardness | HS | 66 |
| 300% Modulus | $Kg/cm^2$ | 93 |
| Tensile strength | $Kg/cm^2$ | 286 |
| Elongation at break | % | 680 |
| Tear strength | $Kg/cm^2$ | 61 |
| Cut growth (de Mattia) | mm/cycle | 18.0/40,000 |

TABLE 9

Properties of the Raw Material Butadiene

| Component | | Content |
|---|---|---|
| propadiene | wt. ppm | less than 5 |
| methylacetylene | " | less than 5 |
| trans-2-butene | wt. % | 0.18 |
| cis-2-butene | " | 0.37 |
| 1,3-butadiene | " | 99.45 |
| 1,2-butadiene | wt. ppm | less than 5 |
| ethylacetylene | " | less than 5 |
| vinylacetylene | " | less than 5 |
| α-acetylene | " | 17 |
| non-volatile matters | wt. % | less than 0.01 |

TABLE 10

Properties of the Raw Material Propylene

| Component | | Content |
|---|---|---|
| Total $C_2$ | wt. % | trace |
| Propane | " | 4.40 |
| Propylene | " | 95.21 |
| Total $C_4$ | " | 0.24 |

TABLE 10-continued

| Properties of the Raw Material Propylene | | |
|---|---|---|
| Component | " | Content |
| Total C$_5$ | " | 0.15 |

EXAMPLE 10

Into a nitrogen purged 25 ml glass polymerization tube at −78° C., 0.12 ml of a toluene solution of a vanadium compound (0.1 mole/liter), 10 ml of a liquid mixture of propylene and butadiene monomers (butadiene/propylene=2/1; mole/mole) and 0.12 ml of a toluene solution of triisobutylaluminum (0.5 mole/liter) were added successively. The tube was then sealed and allowed to stand for 9 hr at −30° C. for the copolymerization to proceed to give the results shown in Table 11.

TABLE 11

| Experiment No. | Vanadium Compound | Alternating Copolymer | |
|---|---|---|---|
| | | Yield | ($\eta$) |
| 1 | VO[OCH(CH$_3$)CH$_2$CH$_3$]$_2$Cl | 1.11 g | 1.02 |
| 2 | VO[OC(CH$_3$)$_3$]$_2$Cl | 0.93 g | 0.88 |

The alternating copolymers prepared as described above did not contain gel and the micro-structure of the butadiene units was 1,4-trans.

EXAMPLE 11

Into a nitrogen purged 25 ml glass polymerization tube at −60° C., 0.04 ml of a hexane solution of di(2,2,4-trimethyl-1-pentoxy)vanadyl chloride: VO-[OCH$_2$C(CH$_3$)$_2$CH$_2$CH(CH$_3$)$_2$]$_2$Cl (0.1 mole/liter), 8 ml of a liquid mixture of propylene and butadiene monomers (butadiene/propylene=1.7/1; mole/mole) and 0.08 ml of a toluene solution of triisobutylaluminum (0.5 mole/liter) were successively added and the tube was then sealed and allowed to stand for 4 hr at −60° C. for the copolymerization to proceed to give 1.24 g of an alternating copolymer of propylene and butadiene. It did not contain gel and the micro-structure of its butadiene units was almost 1,4-trans.

EXAMPLE 12

Into a nitrogen purged 25 ml glass polymerization tube at −78° C., 10 ml of a liquid mixture of propylene and butadiene monomers (butadiene/propylene=1.7/1; mole/mole) and 0.04 ml of a hexane solution of di(2,2,4-trimethyl-1-pentoxy)vanadyl bromide: VO-[OCH$_2$C(CH$_3$)$_2$CH$_2$CH(CH$_3$)$_2$]$_2$Br (0.1 mole/liter) were added and the resulting mixture was kept standing for 10 min. To this mixture was added 0.08 ml of a hexane solution of triisobutylaluminum, then the tube was sealed and was allowed to stand for 3 hr at −60° C. for the copolymerization to proceed. The polymerization was stopped by pouring the contents into methanol containing a small amount of a phenolic antioxidant. During under a reduced pressure afforded 1.61 g of an alternating copolymer of propylene and butadiene without gel and with an intrinsic viscosity of 2.25 and the micro-structure of the butadiene units of the copolymer was almost 1,4-trans.

EXAMPLE 13

Nitrogen purged 25 ml glass polymerization tubes were placed in a bath kept at −78° C., to which were added, respectively, 8 ml of a liquid mixture of propylene and butadiene monomers (butadiene/propylene=1.2/1; mole/mole), 0.08 ml of a hexane solution of dineopentoxyvanadyl chloride: VO-[OCH$_2$C(CH$_3$)$_3$]$_2$Cl (0.1 mole/liter) and a quantity (specified in Table 12) of a hexane solution of triisobutylaluminum (0.5 mole/liter) successively. The tubes were then sealed and the copolymerizations were allowed to proceed by standing for 2 hr at −30° C. to give the results shown in Table 12.

TABLE 12

| Experiment No. | Amount of triisobutylaluminum (0.5 mole/l) | Alternating Copolymer | |
|---|---|---|---|
| | | Yield | ($\eta$) |
| 1 | 0.056 ml | 0.81 g | — |
| 2 | 0.096 ml | 2.21 | — |
| 3 | 0.144 ml | 2.73 | 1.09 |
| 4 | 0.24 ml | 2.53 | — |
| 5 | 0.32 ml | 2.32 | — |

All the alternating copolymers obtained by the above-described procedure did not contain gel and the micro-structure of their butadiene units was almost 1,4-trans.

REFERENCE EXAMPLE 2

To a nitrogen purged 30 ml Erlenmeyer flask, 1.0 mmol (0.19 ml) of diisopropoxyvanadyl chloride: VO-[OCH(CH$_3$)$_2$]$_2$Cl was added at room temperature, then the flask was placed in bath kept at −50° C., to which 5.0 mmol (1.27 ml) of triisobutylaluminum was added slowly with stirring to give a homogeneous mixture. After standing for 10 min, hexane was slowly added to make a 5 ml hexane solution of the catalyst.

A introgen purged 25 ml glass polymerization tube was placed in a bath kept at −78° C., to which was added 10 ml of a liquid mixture of propylene and butadiene monomers (butadiene/propylene=1.7/1; mole/mole), then 1 ml of the hexane solution of the above catalyst (0.2 mmol content based on vanadium) was rapidly added; the tube was sealed and the copolymerization was allowed to proceed by standing for 2.5 hr at −50° C., to give 0.40 g of an alternating copolymer of propylene and butadiene and 0.02 g of a block copolymer of butadiene and propylene, both of which contained gel. The propylene content of the block copolymer was 38 mole %.

EXAMPLE 14

To a nitrogen purged 100 liter stainless steel polymerization reactor were charged, at −75° C., 1.4 Kg of commercial butadiene and 32.3 Kg of commercial propylene with properties listed in Tables 9 and 10, both of which had previously been dehydrated and dried by the use of molecular sieves. To this reactor were added with stirring, successively, 1,400 ml of a hexane solution of triisobutylaluminum (1 mole/liter) and 1,100 ml of a hexane solution of tert-butoxyvanadyl chloride, formed by the reaction between vanadyl trichloride and tert-butanol {considered to have an average composition: VO[OC(CH$_3$)$_3$]$_{0.8}$Cl$_{2.2}$ and to contain VO-[OC(CH$_3$)$_3$]Cl$_2$ and VOCl$_3$ in the ratio of 0.8:0.2 mole/mole}. The reaction was allowed to proceed with stirring and the temperature was allowed to rise to −20° C. during 1 hr, then 6.8 Kg of butadiene was charged further over a period of additional 3 hr. During that operation, stirring was continued and the temperature of the reactor was kept at −10° C.

The reaction was stopped by addition of 2 liter of methanol, the unreacted monomers were evaporated, then catalyst residues were washed off with water and the hexane was removed by distillation to give 11.1 Kg of an oily alternating copolymer of propylene and butadiene. The oily alternating copolymer was either fractionally distilled under a reduced pressure or separated into fractions by chromatography, and the structures of the fractions were studied by mass spectrum, nuclear magnetic resonance spectrum, infrared spectrum, chemical analysis, etc. and were found to be hydrocarbon compounds listed below with an alternating structure of propylene and butadiene. The micro-structure of the butadiene units was 1,4-trans.

at room temperature. The tube was held in a low temperature bath kept at $-10°$ C. Then, 10 ml of liquefied propylene-butadiene mixture (butadiene/propylene molar ratio was 1/1.5) containing 0.1 mmol of triisobutylaluminum were added into the tube and the tube was sealed. Co-polymerization reaction was conducted at $0°$ C. for 2 hours at rest. An alternating copolymer of propylene and butadiene was obtained in a yield of 3.2 g. The microstructure of butadiene units contained in the copolymer was almost in 1,4-trans configuration and the copolymer contained no gel.

EXAMPLE 16

Into a nitrogen purged 25 ml glass polymerization

TABLE 13

| Structure of the Alternating Copolymer | Content wt. % |
|---|---|
| $CH_3CH_2CH_2CH_2CH=CHCH_2\underset{\underset{CH_3}{\|}}{C}=CH_2$ | |
| $CH_3\underset{\underset{CH_3}{\|}}{C}HCH_2CH=CHCH_2\underset{\underset{CH_3}{\|}}{C}=CH_2$ | 27 |
| $CH_3CH_2CH_2CH_2CH=CHCH_2\underset{\underset{CH_3}{\|}}{C}HCH_2CH_2CH=CHCH_2\underset{\underset{CH_3}{\|}}{C}=CH_2$ | |
| $CH_3\underset{\underset{CH_3}{\|}}{C}HCH_2CH=CHCH_2\underset{\underset{CH_3}{\|}}{C}HCH_2CH_2CH=CHCH_2\underset{\underset{CH_3}{\|}}{C}=CH_2$ | 12 |
| $CH_3CH_2CH_2\left[CH_2CH=CHCH_2\underset{\underset{CH_3}{\|}}{C}HCH_2\right]_2 CH_2CH=CHCH_2\underset{\underset{CH_3}{\|}}{C}=CH_2$ | |
| $CH_3\underset{\underset{CH_3}{\|}}{C}H\left[CH_2CH=CHCH_2\underset{\underset{CH_3}{\|}}{C}HCH_2\right]_2 CH_2CH=CHCH_2\underset{\underset{CH_3}{\|}}{C}=CH_2$ | 8 |
| $CH_3CH_2CH_2\left[CH_2CH=CHCH_2\underset{\underset{CH_3}{\|}}{C}HCH_2\right]_3 CH_2CH=CHCH_2\underset{\underset{CH_3}{\|}}{C}=CH_2$ | |
| $CH_3\underset{\underset{CH_3}{\|}}{C}H\left[CH_2CH=CHCH_2\underset{\underset{CH_3}{\|}}{C}HCH_2\right]_3 CH_2CH=CHCH_2\underset{\underset{CH_3}{\|}}{C}=CH_2$ | 6 |
| $CH_3CH_2CH_2\left[CH_2CH=CHCH_2\underset{\underset{CH_3}{\|}}{C}HCH_2\right]_n CH_2CH=CHCH_2\underset{\underset{CH_3}{\|}}{C}=CH_3$ | |
| $CH_3\underset{\underset{CH_3}{\|}}{C}H\left[CH_2CH=CHCH_2\underset{\underset{CH_3}{\|}}{C}HCH_2\right]_n CH_2CH=CHCH_2\underset{\underset{CH_3}{\|}}{C}=CH_2$ | 40 |
| wherein $n \geq 4$ | |
| Others | 7 |
| Total | 100 |

EXAMPLE 15

Into a nitrogen purged 25 ml glass polymerization tube, 0.1 ml of 0.1 molar solution of radical exchange reaction product having mean composition of VO-[OCH(CH$_3$)CH$_2$CH$_3$]$_{0.7}$[OCH(CH$_3$)$_2$]$_{0.3}$Cl$_2$ {which was obtained by reacting sec-butoxyvanadyl dichloride VO[OCH(CH$_3$)CH$_2$CH$_3$]Cl$_2$ with isopropxyvanadyl dichloride VO[OCH(CH$_3$)$_2$]Cl$_2$} in hexane were added tube, 0.12 ml of 0.5 molar solution of tri(2-ethylheptyl)aluminum Al[CH$_2$CH(CH$_2$H$_5$)CH$_2$CH$_2$CH$_2$CH$_2$CH$_3$]$_3$ in hexane and 0.08 ml of 0.1 molar solution of bromine in hexane were added at room temperature and the tube was kept for 10 minutes at rest. Thereafter, the tube was held in a low temperature bath kept at $-78°$ C. Then, 10 ml of liquefied propylene-butadiene mixture (butadiene/propylene molar ratio was 2/1) and 0.04 ml of 0.1 molar solution of vanadyl trineopentoxide VO-[OCH$_2$C(CH$_3$)$_3$]$_3$ in hexane were added, successively, into the tube at the temperature and the tube was sealed. Copolymerization reaction was conducted at −50° C. for 1 hour at rest. The polymerization reaction was terminated by adding a small amount of methanol and then, the reaction products were dried under a reduced pressure. An alternating copolymer of propylene and butadiene containing no gel was obtained in a yield of 0.38 g. Incidentally, the micro-structure of butadiene units thereof was almost in 1,4-trans configuration and intrinsic viscosity was 1.86.

EXAMPLE 17

Into a nitrogen purged 25 ml glass polymerization tube, 0.12 ml of 0.5 molar solution of tri(3,3-dimethylbutyl)aluminum Al[CH$_2$CH$_2$C(CH$_3$)$_3$]$_3$ in hexane and 0.08 ml of 0.1 molar solution of bromine in hexane were added at room temperature and the tube was kept for 10 minutes at rest. Thereafter, the tube was held in a low temperature bath kept at −78° C. Then, 10 ml of liquefied propylene-butadiene mixture (butadiene/propylene molar ratio was 2/1) and 0.04 ml of 0.1 molar solution of vanadyl trineopentoxide in hexane were added, successively, into the tube and the tube was sealed. Copolymerization reaction was conducted at −50° C. for 1 hour at rest. An alternating copolymer of propylene and butadiene containing no gel was obtained in a yield of 1.17 g. The micro-structure of butadiene units thereof was almost in 1,4-trans configuration.

EXAMPLE 18

Into a nitrogen purged 25 ml glass polymerization tube, 0.04 ml of 0.1 molar solution of vanadyl trichloride in hexane and 0.04 ml of 0.1 molar solution of vanadyl trineopentoxide in hexane were added at room temperature and the tube was kept for 10 minutes at rest. Thereafter, the tube was held in a low temperature bath kept at −78° C. Then, 8 ml of liquefied propylene-butadiene mixture (butadiene/propylene molar ratio was 1.2/1) and 0.1 ml of 0.5 molar solution of tri(2-methylbutyl)aluminum Al[CH$_2$CH(CH$_3$)CH$_2$CH$_3$]$_3$ in hexane were added, successively, into the tube and the tube was sealed. Copolymerization reaction was conducted at −30° C. for 1.5 hours at rest. An alternating copolymer of propylene and butadiene containing no gel was obtained in a yield of 2.02 g. Intrinsic viscosity was 1.10 and the micro-structure of butadiene units thereof was almost in 1,4-trans configuration.

EXAMPLE 19

Into nitrogen purged 25 ml glass polymerization tubes, 0.08 ml of 0.5 molar solution of triisobutylaluminum in hexane and varied amounts of 0.1 molar solution of elemental halogen or halide in hexane were added, respectively, at room temperature and the tubes were kept standing for 10 minutes. Then, the tubes were held in a low temperature bath kept at −78° C. and 10 ml of liquefied propylene-butadiene mixture (butadiene/propylene molar ratio was 2/1) and 0.04 ml of 0.1 molar solution of vanadyl trineopentoxide in hexane were respectively added into the tubes and the tubes were sealed. Copolymerization reactions were conducted at −50° C. for 1 hour at rest. The following results were obtained:

TABLE 14

| Experiment No. | Elemental halogen or halide in hexane (0.1 mole/l) | | Alternating Copolymer | |
|---|---|---|---|---|
| | | | Yield | (η) |
| 1 | Br$_2$ | 0.08 ml | 1.38 g | 2.00 |
| 2 | Br$_2$/I$_2$ (4/6 mole/mole) | 0.10 | 1.06 | 1.85 |
| 3 | I$_2$ | 0.12 | 0.90 | 1.74 |
| 4 | IBr | 0.08 | 1.44 | 1.90 |
| 5 | ICl$_3$ | 0.16 | 0.63 | 1.81 |
| 6 | AlBr$_3$ | 0.04 | 1.50 | 1.79 |
| 7 | TiCl$_4$ | 0.04 | 1.05 | 1.70 |
| 8 | MoCl$_5$ | 0.04 | 0.72 | — |
| 9 | FeCl$_3$ | 0.04 | 0.66 | — |
| 10 | PCl$_5$ | 0.04 | 0.73 | — |

EXAMPLE 20

Into nitrogen purged 25 ml glass polymerization tubes, 0.04 ml of 1 molar solution of vanadyl tri(sec-butoxide) VO[OCH(CH$_3$)CH$_2$CH$_3$]$_3$ in toluene and 1 molar solution of halide in toluene (name of halide and the added amount are shown in Table 15) were added at room temperature. Thereafter, the tubes were held in a low temperature bath kept at −78° C. Then, 6 ml of liquefied propylene-butadiene mixture (butadiene/propylene molar ratio was 1/1) and 0.2 ml of 1 molar solution of triisobutylaluminum in toluene were added, successively, into the tubes at the temperature and the tubes were sealed. Copolymerization reactions were conducted at −30° C. at rest. The following results were obtained:

TABLE 15

| Experiment No. | Halide in toluene (1 molar solution) | | Polymerization Conditions | | Alternating Copolymer | |
|---|---|---|---|---|---|---|
| | | | Temp. °C. | Hr. | Yield | (η) |
| 1 | Carbon tetrachloride | 0.01 ml | −30 | 24 | 1.93 g | — |
| 2 | n-Butyl chloride | 0.02 | −30 | 24 | 0.20 | — |
| 3 | SbCl$_5$ | 0.02 | −30 | 2.5 | 1.25 | 0.86 |
| 4 | SnCl$_4$ | 0.02 | −30 | 2.5 | 0.85 | — |
| 5 | POCl$_3$ | 0.02 | −30 | 2.5 | 0.66 | — |

EXAMPLE 21

Into nitrogen purged 25 ml glass polymerization tubes, 0.06 ml of 0.5 molar solution of triisobutylaluminum in hexane and 0.2 molar solution of halide in hexane (name of halide and the added amount are shown in Table 16) were added, respectively, at room temperature. Thereafter, the tubes were held in a low temperature bath kept at −70° C. Then, 10 ml of liquefied propylene-butadiene mixture (butadiene/propylene molar ratio was 1.7/1) and 0.03 ml of 0.1 molar solution of vanadyl trineopentoxide in hexane were respectively added, successively, into the tubes at the temperature and the tubes were sealed. Copolymerization reactions were conducted at −50° C. for 1 hour at rest. The following results were obtained:

TABLE 16

| Experiment No. | Halide in hexane (0.1 molar solution) | | Alternating Copolymer Yield |
|---|---|---|---|
| 1 | Phosgene | 0.015 ml | 1.64 g |
| 2 | Phosgene | 0.02 | 1.93 |
| 3 | Phosgene | 0.03 | 1.26 |
| 4 | Thionyl Chloride | 0.03 | 1.63 |

TABLE 16-continued

| Experiment No. | Halide in hexane (0.1 molar solution) | Alternating Copolymer Yield |
|---|---|---|
| 5 | Hydrogen Bromide 0.05 | 1.48 |

EXAMPLE 22

Into a nitrogen purged 25 ml glass polymerization tube, 0.1 ml of 0.5 molar solution of triisobutylaluminum in hexane and 0.05 ml of 0.1 molar solution of bromine in hexane were added at room temperature and the tube was kept for 10 minutes at rest. Thereafter, the tube was held in a low temperature bath kept at −60° C. Then, 1 ml of liquefied propylene-butadiene mixture (butadiene/propylene molar ratio was 1.7/1), 0.05 ml of 0.1 molar solution of alcoholysis product having mean composition of $VO[OCH_2C(CH_3)_3]_{2.1}[OC(CH_3)_3]_{0.9}$ (which was obtained by reacting vanadyl trineopentoxide with tert-butanol) in hexane and 9 ml of liquefied propylene-butadiene mixture (butadiene/propylene molar ratio was 1.7/1) were added, successively, into the tube at the temperature and the tube was sealed. Copolymerization reaction was conducted at −60° C. for 1 hour at rest. An alternating copolymer of propylene and butadiene was obtained in a yield of 1.02 g. The copolymer contained no gel and the intrinsic viscosity thereof was 2.17. The micro-structure of butadiene units of the copolymer was almost in 1,4-trans configuration.

EXAMPLE 23

Into a nitrogen purged 25 ml glass polymerization tube, 0.03 ml of 0.5 molar solution of triisobutylaluminum in hexane and 0.03 ml of 0.1 molar solution of bromine in hexane were added at room temperature and tube was kept for 10 minutes at rest. Thereafter, the tube was held in a low temperature bath kept at −78° C. Then, 10 ml of liquefied propylene-butadiene mixture (butadiene/propylene molar ratio was 1.7/1) and 0.015 ml of 0.1 molar solution of vanadyl trineopentoxide in hexane were added, successively, into the tube at the temperature and the tube was sealed. Copolymerization reaction was conducted at −60° C. for 5 hours at rest. An alternating copolymer of propylene and butadiene was obtained in a yield of 1.30 g.

On the other hand, an experiment was conducted in the exactly same manner as described above except that the amount of monomer mixture used was 5 ml instead of 10 ml. An alternating copolymer of propylene and butadiene was obtained in a yield of 1.25 g.

REFERENCE EXAMPLE 3

Into a nitrogen purged 25 ml glass pollymerization tube, 0.03 ml of 0.5 molar solution of triisobutylaluminum in hexane and 0.03 ml of 0.1 molar solution of bromine in hexane were added at room temperature and tube was kept for 10 minutes at rest. And then, 5 ml of toluene were further added thereto and the tube was held in a low temperature bath kept at −78° C. Thereafter, 5 ml of liquefied propylene-butadiene mixture (butadiene/propylene molar ratio was 1.7/1) and 0.015 ml of 0.1 molar solution of vanadyl trineopentoxide in hexane were added, successively, into the tube at the temperature and the tube was sealed. Copolymerization reaction was conducted at −60° C. for 5 hours at rest. An alternating copolymer of propylene and butadiene was obtained in a yield of 1.17 g.

The results obtained above show the facts that in comparison of bulk copolymerization and solution copolymerization, bulk copolymerization can give a higher yield of copolymer even if a lower concentration of catalyst (catalyst/monomer ratio) is used and can give a higher yield of copolymer per unit volume of reactor.

EXAMPLE 24

Into nitrogen purged 25 ml glass polymerization tubes, 0.08 ml of 0.5 molar solution of triisobutylaluminum in hexane and a varied amount (shown in Table 17) of 0.5 molar solution of bromoform ($CHBr_3$) in hexane were added, respectively, at room temperature and tubes were kept for 10 minutes at rest. Thereafter, the tubes were held in a low temperature bath kept at −78° C. Then, 10 ml of liquefied propylene-butadiene mixture (butadiene/propylene molar ratio was 1.7/1) and 0.04 ml of 0.1 molar solution of vanadyl trineopentoxide in hexane were respectively added, successively, into the tubes at the temperature and the tubes were sealted. Copolymerization reactions were conducted at −60° C. for 1 hour at rest. The following results were obtained.

TABLE 17

| Experiment No. | Bromoform in hexane (0.5 mole/l) Added amount | Alternating Copolymer Yield | ($\eta$) |
|---|---|---|---|
| 1 | 0.016 ml | 1.60 g | — |
| 2 | 0.040 | 1.82 | 2.13 |

On the other hand, experiments were conducted in the exactly same manner as described above except that order of addition of triisobutylaluminum solution in hexane and vanadyl trineopentoxide solution in hexane was reversed, i.e. vanadyl trineopentoxide was contacted with bromoform firstly instead of contacting triisobutylaluminum with bromoform at first as described in Table 17, the following results were obtained:

TABLE 18

| Experiment No. | Bromoform in hexane (0.5 mole/l) Added amount | Alternating Copolymer Yield | ($\eta$) |
|---|---|---|---|
| 1 | 0.016 ml | 1.15 g | 2.17 |
| 2 | 0.040 | 1.25 | — |

The results mentioned above show the fact that a catalyst obtained by a preparation method in which a halogen component is mixed with trialkylaluminum at first shows a higher catalytic activity than a catalyst obtained by a preparation method in which halogen component is mixed with vanadium component at first.

EXAMPLE 25

Into a nitrogen purged 25 ml glass polymerization tube, 0.064 ml of 0.5 molar solution of vanadyl tri(1-isobutyl-3-methylbutoxide) $VO\{OCH[CH_2CH(CH_3)_2]CH_2CH(CH_3)_2\}_3$ in hexane and 0.016 ml of 0.5 molar solution of vanadyl chloride in hexane were added at room temperature and tube was kept for 10 minutes at rest. Thereafter, the tube was held in a low temperature bath kept at −50° C. Then, 8 ml of liquefied propylene-butadiene mixture (butadiene/propylene molar ratio was 1.2/1) and 0.2 ml of 1 molar solution of triisobutylaluminum in hexane were added, successively, into the tube at the temperature and the tube was sealed. Copolymerization reactions were conducted at −30° C. for 5 hours at rest. An alternating copolymer of propylene and butadiene was obtained in a yield of 1.3 g. The copolymer contained no gel and the intrinsic viscosity thereof was 1.29. The micro-structure of butadiene units of the copolymer was almost in 1,4-trans configuration.

EXAMPLE 26

Into a nitrogen purged 25 ml glass polymerization tube, 0.12 ml of 0.5 molar solution of triisobutylaluminum in hexane and 0.42 ml of 0.1 molar solution of bromine in hexane were added at room temperature and tube was kept for 5 minutes at rest. Thereafter, the tube was held in a low temperature bath kept at −78° C. Then, 2 ml of liquefied propylene-butadiene mixture (butadiene/propylene molar ratio was 1.7/1), a mixed solution of 0.036 ml of 0.1 molar solution of vanadyl trineopentoxide in hexane and 0.024 ml of 0.1 molar solution of vanadyl tri(tert-butoxide) $VO[OC(CH_3)_3]_3$ in hexane, and 8 ml of liquefied propylene-butadiene mixture (butadiene/propylene molar ratio was 1.7/1) were added, successively, into the tube at the temperature. Copolymerization reaction was conducted at −60° C. for 2 hours at rest. An alternating copolymer of propylene and butadiene was obtained in a yield of 1.63 g.

An experiment was carried out in the exactly same manner as described above except that 10 ml of liquefied propylene-butadiene mixture were added in liue of 2 ml of liquefied propylene-butadiene mixture used in the above experiment and final addition of 8 ml of liquefied propylene-butadiene mixture was omitted. An alternating copolymer of propylene and butadiene was obtained in a yield of 1.06 g.

Incidentally, the copolymers obtained in both experiments contain no gel and the micro-structures of butadiene units of the copolymers were almost in 1,4-trans configuration.

EXAMPLE 27

In a nitrogen purged 25 ml glass polymerization tube, 0.07 ml of 0.1 molar solution of vanadyl triisopropoxide $VO[OCH(CH_3)_2]_3$ in hexane and 0.03 ml of 0.1 molar solution of vanadyl tri(tert-butoxide) in hexane were mixed at room temperature and tube was kept for 10 minutes at rest. Thereafter, the tube was held in a low temperature bath kept at −78° C. Then, 0.1 ml of 0.1 molar solution of bromine in hexane, 10 ml of liquefied propylene-butadiene mixture (butadiene/propylene molar ratio was 1.7/1) and 0.1 ml of 1 molar solution of triisobutylaluminum in hexane were added, successively, into the tube at the temperature. Copolymerization reaction was conducted at −50° C. for 17.5 hours at rest. An alternating copolymer of propylene and butadiene was obtained in a yield of 1.37 g. The copolymer contained no gel and the micro-structure of butadiene units of the copolymer was almost in 1,4-trans configuration.

REFERENCE EXAMPLE 4

Into a nitrogen purged 30 ml Erlenmeyer flask, 1.0 mmol (0.34 ml) of vanadyl trineopentoxide and 1.0 mmol (0.073 ml) of thionyl chloride were added at room temperature and the contents were commingled to give a homogeneous mixture. Then, the tube was held in a low temperature bath kept at −50° C. and 6.0 mmol (1.53 ml) of triisobutylaluminum were slowly added under agitation to give a homogeneous mixture. The mixture was kept for 10 minutes at rest. A catalyst solution in hexane was prepared by adding hexane, slowly, into the tube to make total amount of the content as 2 ml.

Independent of the above, a nitrogen purged 25 ml glass polymerization tube was held in a low temperature bath kept at −78° C., 10 ml of liquefied propylene-butadiene mixture (butadiene/propylene molar ratio was 1.7/1) were added into the tube. Then, 1 ml of the catalyst solution in hexane (0.5 mmol as vanadium) prepared in the Erlenmeyer flask was added, rapidly, into the tube and the tube was sealed. Copolymerization reaction was carried out at −50° C. for 40 minutes at rest. A block copolymer of butadiene and propylene was obtained in a yield of 3.22 g. The copolymer contains gel in an amount of approximately 10%.

Propylene content of the chloroform soluble fraction of the copolymer was 43.2 mol %, intrinsic viscosity thereof was 0.9 and the micro-structures of butadiene units contained therein were as follows:

| 1,4-trans: | 89.8% |
|---|---|
| 1,2-vinyl: | 10.2% |

Propylene content of the croloform insoluble gel fraction was 33.8 mol %.

EXAMPLE 28

Into a nitrogen purged 100 liter stainless steel polymerization reactor, 25.0 Kg of commercial butadiene (composition thereof is shown in Table 21) and 9.7 Kg of commercial propylene (composition thereof is shown in Table 22) both were dehydrated and dried by the use of molecular sieve, were charged and the content was kept at −50° C.

Independent of the above, in a nitrogen purged 1 liter flask, 200 ml of 0.5 molar solution of triisobutylaluminum in hexane and 389 ml of 0.05 molar solution of bromine in hexane were mixed at the room temperature and kept for 10 minutes at rest. Immediately thereafter, the catalyst was added into the polymerization reactor. Then, 200 ml of 0.05 molar solution of vanadyl trineopentoxide in hexane were added into the polymerization reactor. Copolymerization reaction was carried out at −50° C. for 6 hours under agitation.

Copolymerization reaction was terminated by adding 1 liter of methanol containing a small amount of an antioxidant and the unreacted monomers were removed by evaporation. An alternating copolymer of propylene and butadiene was obtained in a yield of 7.18 Kg.

The copolymer contains no gel, the micro-structure of butadiene units contained therein was almost 1,4-trans configuration, intrinsic viscosity of the copolymer was 2.1 and number average molecular weight of the copolymer was 114,000.

To 100 wt. parts of alternating copolymer rubber thus obtained, carbon black (IISAF) 50 wt. parts, aromatic oil 5 wt. parts, antioxidant D (N-phenyl-β-naphthylamine) 1 wt. part, ZnO 3 wt. parts, stearic acid 2 wt. parts, valcanization accelerator (MSA) 1 wt. part and sulfur 0.5 wt. part were compounded by roll-mixing and vulcanization was carried out in a conventional manner at 150° C. for 55 minutes. The following results were obtained:

TABLE 19

| Properties of the Unvulcanized Compound | | |
|---|---|---|
| Item | | Value |
| Mooney viscosity | $ML_{1+4}^{100°\ C.}$ | 108 |
| Green strength | $Kg/cm^2$ | 5.8 |
| Tackiness | $Kg/cm^2$ | 0.56 |
| Elongation at break | % | 300 |

TABLE 20

| Properties of the Vulcanized Compound | | |
|---|---|---|
| Item | | Value |
| Shore Hardness | HS | 64 |
| 300% Modulus | $Kg/cm^2$ | 105 |
| Tensile strength | $Kg/cm^2$ | 293 |
| Elongation at break | % | 630 |
| Tear strength | $Kg/cm^2$ | 58 |
| Cut growth (de Mattia) | mm/cycle | 17.4/80,000 |

TABLE 2

| Properties of the Raw Material Butadiene | | |
|---|---|---|
| Component | | Content |
| Propadiene | wt. ppm | less than 5 |
| Methylacetylene | " | less than 5 |
| Trans-2-butene | wt. % | 0.21 |
| Cis-2-butene | " | 0.30 |
| 1,3-butadiene | " | 99.49 |
| 1,2-butadiene | wt. ppm | less than 5 |
| Ethylacetylene | " | less than 5 |
| Vinylacetylene | " | less than 5 |
| α-acetylene | " | 20 |
| Non-volatile matters | wt. % | less than 0.01 |

TABLE 22

| Properties of the Raw Material Propylene | | |
|---|---|---|
| Component | | Content |
| propane | wt. % | 0.4 |
| propylene | " | 99.4 |
| air | " | 0.2 |

EXAMPLE 29

Into a nitrogen purged 100 liter stainless steel polymerization reactor, 17.7 Kg of commercial butadiene (composition thereof is shown in Table 21) and 8.0 Kg of commercial propylene (composition thereof is shown in Table 22), both were dehydrated and dried by the use of molecular sieve, were charged and the content was kept at −55° C.

Independent of the above, into a nitrogen purged 20 liter stainless steel catalyst preparation vessel, 7.2 Kg of commercial butadiene shown above and 3.2 Kg of commercial propylene shown above were charged and the content was kept at −60° C. Then, 100 ml of hexane solution containing 0.0203 mol of vanadyl trineopentoxide and 0.0087 mol of vanadyl tri(tert-butoxide) and 200 ml of hexane solution containing 0.29 mol of triisobutylaluminum and 0.029 mol of bromine were added, successively, into the catalyst preparation vessel under agitation. After 1 minute, the content of the catalyst preparation vessel was passed to the 100 liter polymerization reactor through a conduit and copolymerization reaction was conducted at −57° C. for 4 hours under agitation.

The copolymerization reaction was terminated by adding 1 liter of methanol containing a small amount of phenol type antioxidant. The unreacted monomers were removed by evaporation. Thus, an alternating copolymer of propylene and butadiene was obtained in a yield of 8.8 Kg. The copolymer contained no gel and the microstructure of butadiene units of the copolymer was almost in 1,4-trans configuration, intrinsic viscosity of the copolymer was 2.04 and number average molecular weight of the copolymer was 110,000.

To 100 wt. parts of alternating copolymer rubber thus obtained, carbon black (IISAF) 50 wt. parts, aromatic oil 5 wt. parts, antioxidant D (N-phenyl-β-naphthylamine) 1 wt. part, ZnO 3 wt. parts, stearic acid 2 wt. parts, valcanization accelerator (MSA) 1 wt. part and sulfur 0.5 wt. part were compounded by roll-mixing and vulcanization was carried out in a conventional manner at 150° C. for 55 minutes. The following results were obtained:

TABLE 23

| Properties of the Unvulcanized Compound | | |
|---|---|---|
| Item | | Value |
| Mooney viscosity | $ML_{1+4}^{100°\ C.}$ | 90 |
| Green strength | $Kg/cm^2$ | 5.7 |
| Tackiness | " | 1.7 |
| Elongation at break | % | 420 |

TABLE 24

| Properties of the Vulcanized Compound | | |
|---|---|---|
| Item | | Value |
| Shore Hardness | HS | 65 |
| 300% Modulus | $Kg/cm^2$ | 110 |
| Tensile strength | $Kg/cm^2$ | 272 |
| Elongation at break | % | 590 |
| Tear strength | $Kg/cm^2$ | 62 |

EXAMPLE 30

Into a nitrogen purged 25 ml glass polymerization tube, 0.053 ml of 0.1 molar solution of vanadyl trineopentoxide in hexane and 0.027 ml of 0.1 molar solution of vanadyl trichloride in hexane were added and commingled each other at room temperature and kept standing for 10 minutes. Then, the polymerization tube was held in a low temperature bath kept at −78° C. and 8 ml of liquefied propylene-butadiene mixture (butadiene/propylene molar ratio was 1.2/1) and 0.24 ml of 0.5 molar solution of triisobutylaluminum in hexane were added, successively, thereto and the tube was sealed. Copolymerization reaction was conducted at −30° C. for 80 minutes at rest. An alternating copolymer of propylene and butadiene was obtained in a yield of 2.43 g. The copolymer contained no gel and the micro-structure of butadiene units of the copolymer was almost 1,4-trans configuration, intrinsic viscosity thereof was 1.04.

We claim:

1. A process for bulk alternating copolymerization of propylene and butadiene which comprises contacting propylene and butadiene in liquid phase in the presence of a catalyst system containing (A) a trialkylaluminum compound represented by the general formula $AlP^1R^2R^3$ and (B) (i) $VOX_3$ and $Al(OR')(OR'')(OR''')$, (ii) $VO(OR')_m(OR'')_nX_{3-m-n}$ or (iii) $VO(OR')(OR'')(OR''')$ and a halogen component other than fluorine, under a pressure sufficient to keep the monomers in liquid phase at a temperature within the range of $-100°-+50°$ C., wherein the trialkylaluminum compound and (i) $VOX_3$ and $Al(OR')-(OR'')(OR''')$, (ii) $VO(OR')_m(OR''')_nX_{3-m-n}$ or (iii) $VO(OR')(OR'')(OR''')$ are brought into contact in the presence of a monomer or monomers at a temperature within the range of $-100°-+50°$ C., the molar ratio of propylene/butadiene in the feed is within the range of 20/1-1/10 and the ratio of the number of moles of trialkylaluminum compound to the number of moles of vanadyl component in the catalyst system is within the range of 0.5-100, wherein $R^1$, $R^2$, and $R^3$, are the same or different and each is selected independently from the group consisting of a straight chain, a branched chain and a cyclic, monovalent aliphatic hydrocarbon radical with 4 to 9 carbon atoms, and R', R" and R''' of the alkoxyl group are the same or different and each is selected independently from the group consisting of a straight chain, a branched chain and a cyclic, monovalent aliphatic hydrocarbon radical with three to nine carbon atoms, X is chlorine or bromine, and m+n is 0.2-2.

2. The process of claim 1 wherein the amount of the monomer or monomers required for the contact with the system containing the trialkylaluminum compound and the system containing the vanadyl component is within the range of 1/50-½ of the total amount of the monomers, used for the copolymerization.

3. The process of claim 2 wherein each catalyst component is used as a solution in a monomer or monomers.

4. The process of claim 1 wherein the trialkylaluminum compound is triisobutylaluminum.

5. The process of claim 1 wherein the catalyst system contains (A) the trialkylaluminum and (B) $VOX_3$ and $Al(OR')(OR'')-(OR''')$.

6. The process of claim 1 wherein the catalyst system contains (A) the trialkylaluminum and (B) $VO(OR')_m(OR'')_nX_{3-m-n}$.

7. The process of claim 6 wherein each m and n is an integer which satisfies the equation: $m+n=1$ or 2.

8. The process of claim 6 wherein m+n satisfies the equation: $2<m+n\geq0.2$, and said $VO(OR')_m(OR'')_nX_{3-m-n}$ is a mixture of $VOX_3$ and an alkoxyvanadyl halide.

9. The process of claim 1 wherein the catalyst system contains (A) the trialkylaluminum and (B) $VO(OR')(OR'')(OR''')$ and a halogen component, said halogen component is selected from the group consisting of chlorine, bromine, iodine; a chloride, a bromide, an iodide, an oxychloride, an oxybromide and an oxyiodide of hydrogen, a transition metal element and an element of IIIA, IVA, VA, VIA and VIIA Group of Periodic Table.

10. The process of claim 9 wherein said catalyst system is obtained by contacting (A) a mixture of said halogen component and the trialkylaluminum compound with (B) the vanadyl trialkoxide compound.

* * * * *